United States Patent
Gunaseelan et al.

(10) Patent No.: US 7,711,647 B2
(45) Date of Patent: May 4, 2010

(54) DIGITAL RIGHTS MANAGEMENT IN A DISTRIBUTED NETWORK

(75) Inventors: Lakshminarayanan Gunaseelan, Milpitas, CA (US); Abdul Salam Faisal Padinjareveetil, Foster City, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 1075 days.

(21) Appl. No.: 11/148,899

(22) Filed: Jun. 9, 2005

(65) Prior Publication Data

US 2005/0278259 A1  Dec. 15, 2005

Related U.S. Application Data

(60) Provisional application No. 60/578,670, filed on Jun. 10, 2004.

(51) Int. Cl.
  *G06F 17/60* (2006.01)
(52) U.S. Cl. ............... 705/59; 705/50; 705/51; 713/161
(58) Field of Classification Search .......... 705/59, 705/50, 51; 713/161
  See application file for complete search history.

(56) References Cited

U.S. PATENT DOCUMENTS

| | | | |
|---|---|---|---|
| 5,774,668 A | 6/1998 | Choquier | |
| 6,003,030 A | 12/1999 | Kenner | |
| 6,108,703 A | 8/2000 | Leighton | |
| 6,185,598 B1 | 2/2001 | Farber | |
| 6,421,726 B1 | 7/2002 | Kenner | |
| 7,155,723 B2 | 12/2006 | Swildens | |
| 7,299,291 B1 | 11/2007 | Shaw | |
| 7,310,729 B2 * | 12/2007 | Gordon et al. | 713/161 |
| 7,409,456 B2 | 8/2008 | Sitaraman | |
| 7,536,725 B2 | 5/2009 | Raciborski | |
| 2004/0024688 A1 * | 2/2004 | Bi et al. | 705/37 |
| 2005/0071280 A1 | 3/2005 | Irwin et al. | |
| 2006/0020784 A1 | 1/2006 | Jonker et al. | |
| 2007/0289025 A1 * | 12/2007 | Tanaka et al. | 726/28 |

FOREIGN PATENT DOCUMENTS

JP    2004032307 A  *  1/2004

\* cited by examiner

*Primary Examiner*—Pierre E Elisca
(74) *Attorney, Agent, or Firm*—David H. Judson

(57) ABSTRACT

The present invention is implemented within a distributed network operating environment (such as a CDN) in which content providers offload given content for delivery from servers (e.g., CDN edge servers) managed by a service provider (such as a CDN operator). It is assumed that the given content is secured using a digital rights management (DRM) scheme. According to the invention, a distributed set of license server processes are provided to manage the issuance of content licenses. Each of the license server processes is operative to generate licenses by which a given end user client obtains given rights for given content, typically the content served from the machine. A distributed set of license server processes operates in a de-centralized manner and without access to third party business logic (e.g., a payment mechanism) or authentication information associated with end users requesting the given content.

14 Claims, 6 Drawing Sheets

```
<%
Dim objTokenGen

Set objTokenGen = Server.CreateObject("…")

' A simple case for license pre-delivery. Public key and license seed
' are not passed in the token.
objTokenGen.CpCode = "12345"
objTokenGen.Salt = "dhlLmph*R……..!i4SoFppANITta8…sV="
objTokenGen.SpecID = "0"
objTokenGen.RightsID = "1"
objTokenGen.KeyID = "MY_CONTENT_KEY_ID"
objTokenGen.ClientInfo = clientinfo
objTokenGen.TimeWindow = 10 set objRights = Server.CreateObject("…")
if (err.number <> 0) then
    %> Can't Create Dynamic Rights Object <br> <%
    exit do
end if objRights.PlayCount = 8
objRights.ExpirationAfterFirstUse = 120
objRights.ExpirationDate = "20050701 12:23:24"

' Add them to the token
objTokenGen.DynamicRights = objRights.GetAllRights

Dim Token

Token = objTokenGen.QueryString

Set objTokenGen = Nothing
```

Figure 7

DIGITAL RIGHTS MANAGEMENT IN A DISTRIBUTED NETWORK

This application is based on and claims priority from Provisional Application Ser. No. 60/578,670, filed Jun. 10, 2004.

BACKGROUND OF THE INVENTION

1. Technical Field

The present invention relates generally to techniques for content delivery.

2. Description of the Related Art

It is known in the art for a content provider to outsource its content delivery requirements to a content delivery network (a "CDN"). A content delivery network is a collection of content servers and associated control mechanisms that offload work from Web site origin servers by delivering content on their behalf to end users. A well-managed CDN achieves this goal by serving some or all of the contents of a site's Web pages, thereby reducing the customer's infrastructure costs while enhancing an end user's browsing experience from the site. For optimal performance, the CDN service provider may maintain an objective, detailed, real-time view of the Internet's topology, reliability, and latency, and this view may then be used to power a dynamic DNS-based system to direct end users to the best CDN server to handle a particular request.

Digital Rights Management (DRM) refers to the technology used for the protection of digital media content, typically audio or audiovisual works. DRM works by encrypting the content before distribution, and by limiting access to only those end-users who have acquired a proper license to play the content. The DRM license enforcement is done at the player/client, and therefore, the integrity of the client-side (of DRM) is critical for the scheme to work. Microsoft, Real and Apple have developed proprietary DRM technologies for their audio and audiovisual content distribution. Apple's DRM technology is used in its iTunes music service. Microsoft and Real Networks support DRM protection for both on-demand and live media content. There are some standardization efforts around DRM (MPEG4/ISMA and Open Mobile Alliance), but these standards are still in the specification stage.

An end-to-end DRM system typically comprises three (3) parts: encryption, business-logic and license-delivery. DRM starts with the encryption of the content. Once the content is encrypted, a key is required to unlock the content. The encrypted content can be delivered through any number of delivery methods: HTTP, streaming, FTP, P2P, email, or the like. An end-user who desires to play the content visits an e-commerce web site and transacts with the business-logic process, usually involving one of registration, login, and/or payment; once this is done, the end-user is issued a license to play the content. The issued license typically comprises (i) a key (for decrypting the content), (ii) a set of rights (e.g. play exactly once, play for 30 days, or the like), and (iii) with the property that the license is valid only on the end-user machine to which it is issued. When an end-user attempts to play the DRM protected content, the player first checks the license cache on the machine, and if a license is found, the playback starts by decrypting the content. If a license is not found, the player attempts to get a license, typically from the storefront URL that is embedded in the content. Ultimately, it is the player/client that enforces the DRM. In a typical DRM scenario, a media file (e.g., a stream) is encrypted by a packager component using a key. Alternatively, the stream can be encrypted on the fly by an encoder. A streaming Server serves the encrypted stream to an end user browser's media player.

As noted above, the player needs to get a license (which includes the key) from a license server to decrypt and play the content.

In the past, administration and management of the DRM license keys has taken place in a centralized manner, primarily to address security issues. It would highly desirable to be able to leverage the distributed nature of a content delivery network to facilitate a distributed (non-centralized) license delivery infrastructure. This present invention addresses this need.

BRIEF SUMMARY OF THE INVENTION

It is an object of the present invention to provide a distributed architecture for digital rights management (DRM) license delivery.

It is a further object of the invention to leverage the distributed infrastructure of a content delivery network (CDN) to enable management and distribution of DRM license keys, preferably in a non-centralized (i.e., distributed manner).

It is another object of the invention to provide for a distributed architecture for license delivery wherein the entity (e.g., the CDN) that provides the license key distribution does not maintain or have access to identifying information for the anticipated users of the protected content.

Thus, the present invention envisions a distributed license delivery infrastructure that is separate from any centralized database in which is stored information about the end users that may desire to obtain the content protected by the license. An advantage of this solution is that is separates the business logic from any validation scheme, and hence allows content providers to implement flexible business rules that are appropriate for their business. In a preferred embodiment, the CDN service provider need not maintain a database of all the end-users of the CDN customers. The CDN provides license delivery but is not directly involved in authenticating the requesting end-user's identity, collecting payment or obtaining credit-card information; rather, the CDN simply authenticates the end-user's request (as opposed to the user) before issuing the license and, ultimately, delivering the stream. The invention thus separates the business-logic from license delivery in the context of a DRM-implemented CDN solution offering.

It is a further general object of the present invention to facilitate music distribution and subscription-based media services over a content delivery network (CDN).

Generalizing, the present invention is implemented within a distributed network operating environment (such as a CDN) in which content providers offload given content for delivery from servers (e.g., CDN edge servers) managed by a service provider (such as a CDN operator). It is assumed that the given content is secured using a digital rights management scheme. According to the invention, a distributed set of license server processes are provided to manage the issuance of content licenses. Each of the license server processes are operative to generate licenses by which a given end user client obtains given rights for given content. The distributed set of license server processes operate in a de-centralized manner and without access to authentication information associated with end users requesting the given content.

The foregoing has outlined some of the more pertinent features of the invention. These features should be construed to be merely illustrative. Many other beneficial results can be

BRIEF DESCRIPTION OF THE DRAWINGS

FIG. 7 illustrates a dynamic rights object that may be created and used by a license server to enforce dynamic license rights on a per request basis.

DETAILED DESCRIPTION OF THE PREFERRED EMBODIMENT

It is known to deliver digital content (e.g., HTTP content, streaming media and applications) using an Internet content delivery network (CDN). A CDN is a network of geographically distributed content delivery nodes that are arranged for efficient delivery of content on behalf of third party content providers. Typically, a CDN is implemented as a combination of a content delivery infrastructure, a request-handling mechanism (preferably based in DNS), and a distribution infrastructure. The content delivery infrastructure usually comprises a set of "surrogate" origin servers that are located at strategic locations (e.g., Internet network access points, Internet Points of Presence, and the like) for delivering content to requesting end users. The request-handling mechanism (typically a set of name servers) allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently accessed content from a surrogate that is optimal for a given requesting client. In a typical CDN, a single service provider operates the request-handlers, the surrogates, and the content distributors. In addition, that service provider establishes business relationships with content publishers and acts on behalf of their origin server sites to provide a distributed delivery system.

Figure 1:
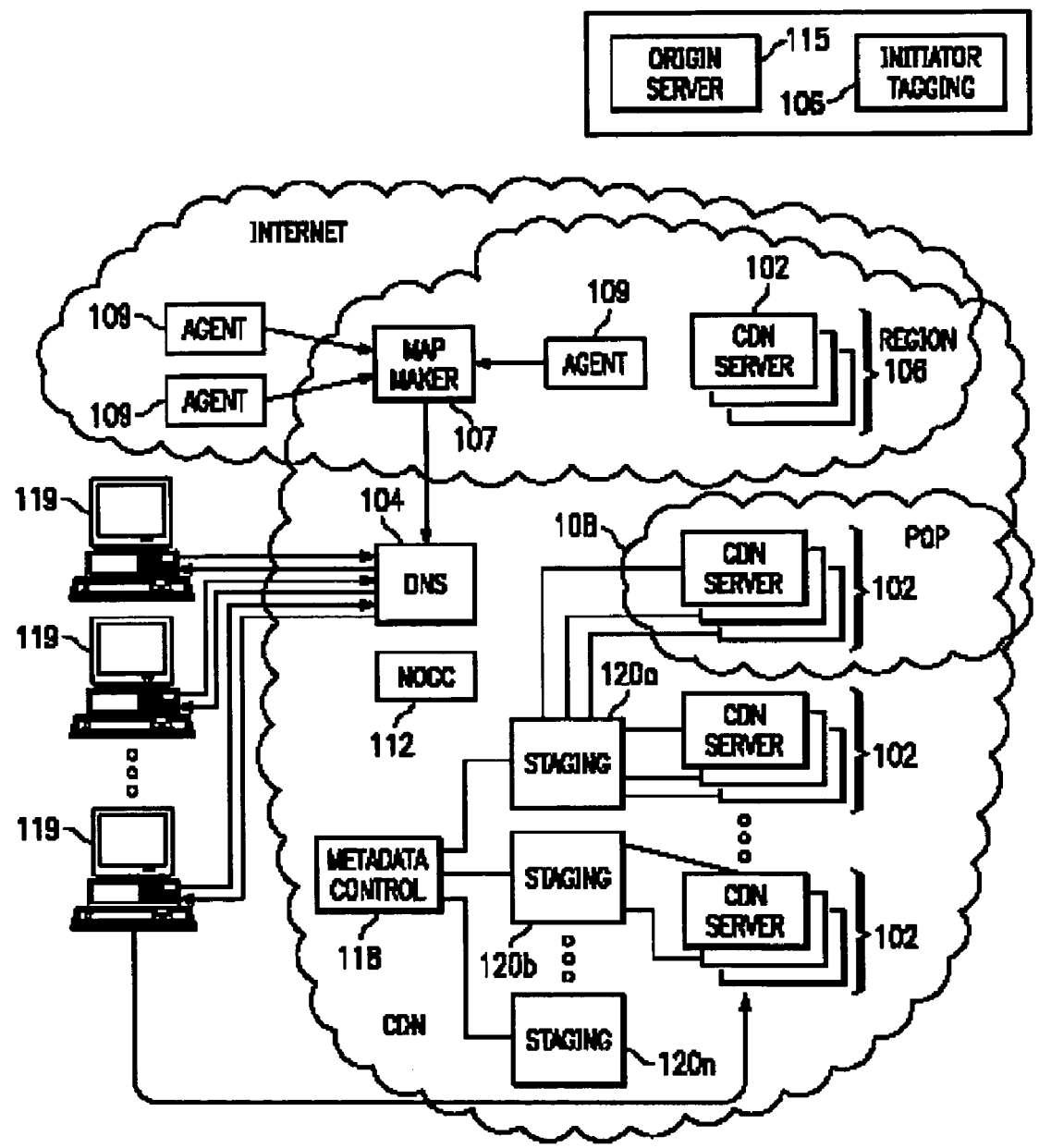
FIG. 1 is a block diagram of a known distributed network (such as a content delivery network) in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The mechanism 104 allocates servers 102 in the content delivery infrastructure to requesting clients. Typically, the mechanism 104 is implemented within (or as an adjunct to) a DNS subsystem managed by the CDN service provider. The distribution infrastructure consists of on-demand or push-based mechanisms that move content from the origin server to the surrogates. A CDN service provider (CDNSP) may organize sets of surrogate origin servers as a group or so-called "region." In this type of arrangement, a CDN region 106 typically comprises a set (or cluster) of one or more content servers that share a common back-end network, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Win2K) and having suitable RAM and disk storage for CDN applications and content delivery network content (e.g., HTTP content, streaming media and applications). Such content servers are sometimes referred to as "edge" servers as they are located at or near the so-called outer reach or "edge" of the Internet. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a content migrator or rewrite tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or sub-domain) by a DNS directive (e.g., a CNAME). In either case, the CDNSP may provide object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer code, other control codes, etc.), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. A representative CDN DNS request routing mechanism is described, for example, in U.S. Pat. No. 6,108,703, the disclosure of which is incorporated herein by reference. Once an edge server is identified, the browser passes the object request to the server, which applies the metadata supplied from a configuration file or HTTP response headers to determine how the object will be handled. The CDN may also include other infrastructure, such as a distributed data query and collection system that collects usage and other data from the edge servers, aggregates that data across a region or set of regions, and passes that data to other back-end systems to facilitate monitoring, logging, alerts, billing, management and other operational and administrative functions.

As also seen in FIG. 1, the CDNSP also may operate a metadata transport system 116 comprising a set of one or more servers to enable metadata to be provided to the CDNSP content servers. The transport system 116 may comprise at least one control server 118, and one or more staging servers 120*a-n*, each of which is typically an HTTP server (e.g., Apache). Metadata is provided to the control server 118 by the CDNSP or the content provider (e.g., using a secure extranet application) and periodically delivered to the staging servers 120*a-n*. The staging servers deliver the metadata to the CDN content servers as necessary. Metadata is useful for controlling how the content is managed at the edge server.

The above described content delivery network is merely illustrative. The present invention may leverage any content delivery infrastructure.

Figure 2:
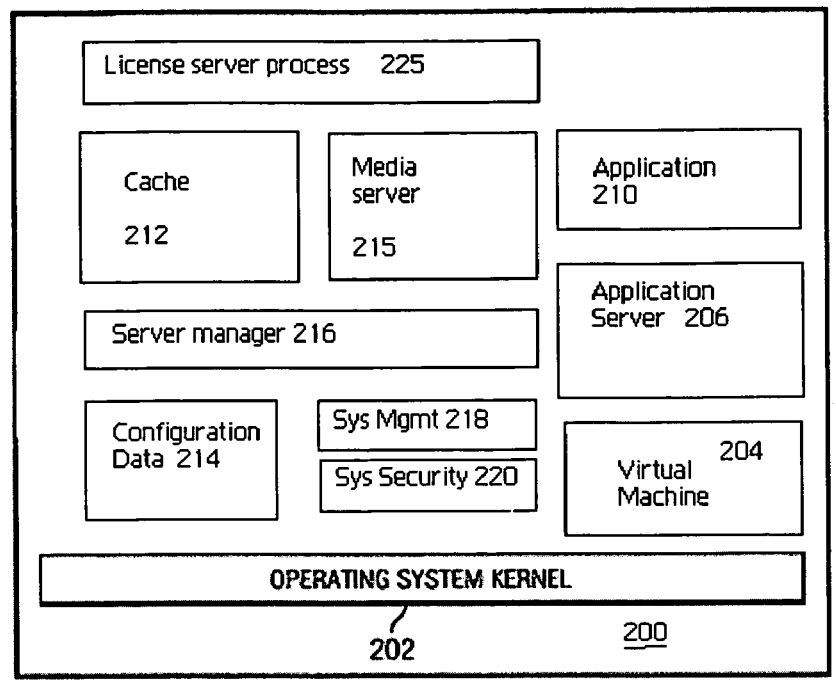
FIG. 2 illustrates a typical machine configuration for an edge server in the distributed network of FIG. 2.

FIG. 2 illustrates a typical machine configuration for a CDN content edge machine, sometimes referred to generally as a server. Typically, the machine 200 comprises commodity hardware running an operating system 202. The machine may optionally include a virtual machine 204 and an application server 206 to facilitate the execution of one or more customer application or application components 210. For handling HTTP content, the machine 200 typically implements a cache 212. The machine also includes a store for customer configuration data 214, typically in the form of customer-specific metadata, which controls how content is managed on the machine. A server manager 216 overlays and controls the cache 212, using the customer configuration data. For streaming media, the machine includes one or more media servers 215, such as a Windows Media Server (WMS), as required by the supported media formats. The server manager 216 may also control the media server according to the customer configuration data. System management 218 and system security 220 modules are also provided to facilitate these and other conventional functions. The machine may also incude logging processes, name server processes, data aggregation processes, and the like. For purposes of the present invention, as will be described below, a given machine includes a rights management license server process 225, which faciliates a de-centralized DRM-based license serving model. The license server process 225 serves DRM licenses for the protected content served from the machine, or for the protected content served from machines co-located with the machine.

By way of additional background, digital rights management (DRM) solutions are well-known in the art. One such known DRM system available from Microsoft Corporation includes a Digital Rights Manager that can be integrated into a content delivery network (CDN) according to the present invention. In this example, a Windows Media Rights Manager helps protect digital media (such as songs and videos) by packaging digital media files. The present invention is not limited to use with DRM solutions from any particular vendor, of course. Indeed, the present invention assume the existence of a third party DRM solution (available from a DRM solutions provider) and concerns how that solution (and, in particular, the license server(s)) may be implemented within the CDN, taking advantage of the CDN's distributed or de-centralized infrastructure.

In a typical DRM solution, a packaged media file is a version of the media file that has been encrypted and locked with a key. In the Microsoft DRM solution, keys are created and used in the Windows Media Rights Manager. In particular, the key used to encrypt the content is computed from a seed and a KeyID, namely: Seed+KeyID=Key. Typically, for purposes of the present invention, one seed will be chosen per content provider, and this seed is then used to encrypt all of content provider's content. The KeyID component is designed to vary by file. The content provider may use a different KeyID per file, or alternatively, it may choose to encrypt all of its files (or a collection of files) using a single KeyID. A license issued for a given KeyID will apply to all the files encrypted using the same KeyID. To generate a key, a license key seed and a key ID are needed. The license key seed is a value that is known only to the content owner and the DRM license server. The content owner creates a KeyID for each protected file. This value is included in the packaged file. When the license server needs to issue a license for a packaged file, a key can be recreated by retrieving the key ID from the packaged file. The Windows Media License Service uses the license key seed and the key ID from the packaged file to create a key. The key is included in the license sent to the end user's computer. Using the key included in the license, the player on the consumer's computer can open and play the protected file.

Figure 3:
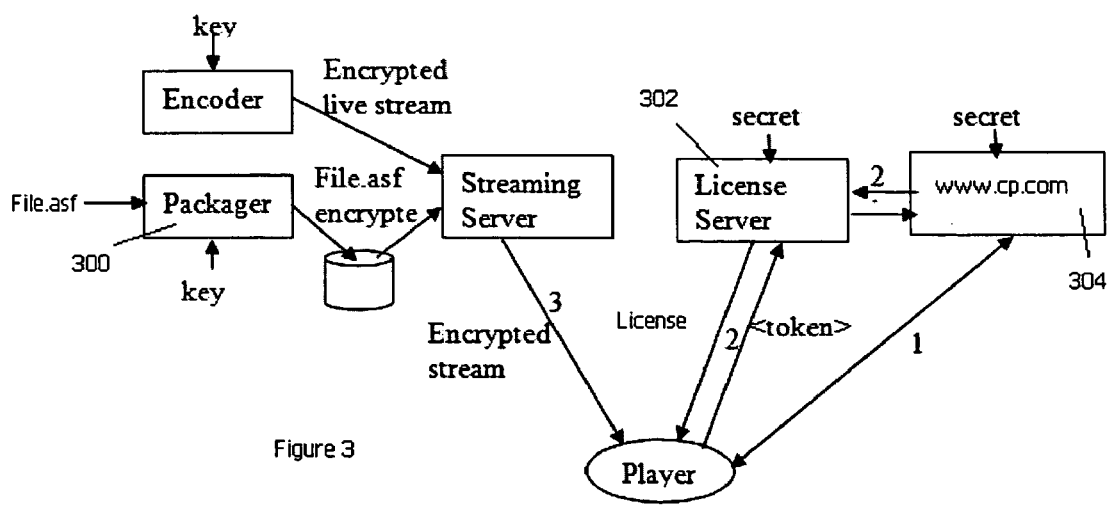
FIG. 3 illustrates the basic components of a DRM solution that is implemented in a CDN according to the present invention.

FIG. 3 illustrates the inventive DRM CDN solution. The three (3) primary components of the full end-to-end DRM solution are (i) packager 300 (ii) license server 302 and (iii) E-commerce storefront (or its equivalent) 304. The packager 300 typically is software (a set of program instructions executable on a processor) used to encrypt the content. This software may run at a CDN customer premise (an origin server), or on one or more CDN servers. The license servers 302 issue licenses to end-users' players and are managed by the CDN. According to a technical advantage of the present invention, the license servers 302 operate in a distributed or de-centralized manner, leveraging the basic infrastructure of the CDN itself, as opposed to operating in a centralized manner of the prior art. The E-commerce storefront 304 preferably is set up and managed by the content provider or some third party on the content provider's behalf. The following process flow illustrates the basic operation of the invention. At step (1), an end-user visits the content provider's web site and performs a business transaction. After registration/login and/or payment collection, once the content provider decides to make the content available to the end-user, the content provider's site generates a token (using the shared-secret agreed between the CDN service provider and the content provider) and sends the end-user's browser (the player) to the CDN license server. Typically, this will be done in the background while the end-user stays on the content provider's site. At step (2), the License server validates the token presented by the end-user's browser. The token usually has information to issue the license to "user U with rights R for content C." The license server first validates the token using the shared secret to ensure that the token has been issued by the content-provider's site. Once the token is found to be valid, it generates and issues a DRM license <U, R, C> to the end-user. Typically, this entire step 2 will be transparent to the end-users. Alternatively, the content provider's site can choose to get the license itself directly from the CDN license servers and forward the license to the end-user. This is shown as step 2' in FIG. 3. This latter approach ensures a much more secure workflow as the license servers can be configured (e.g., via metadata access control lists (ACLs)) to issue licenses only to the content provider's web-servers. At step (3), the end-user clicks on the URL at the content provider's site to play a stream. This request will hit a CDN streaming server. The streaming server will send the encrypted content to the player. The playback will start since a license is already present. In the event a user attempts to play a piece of content directly from a CDN server without first going the content provider's site, the store-front URL embedded in the content would direct the end-user's player to the content-provider's site.

Figure 4:
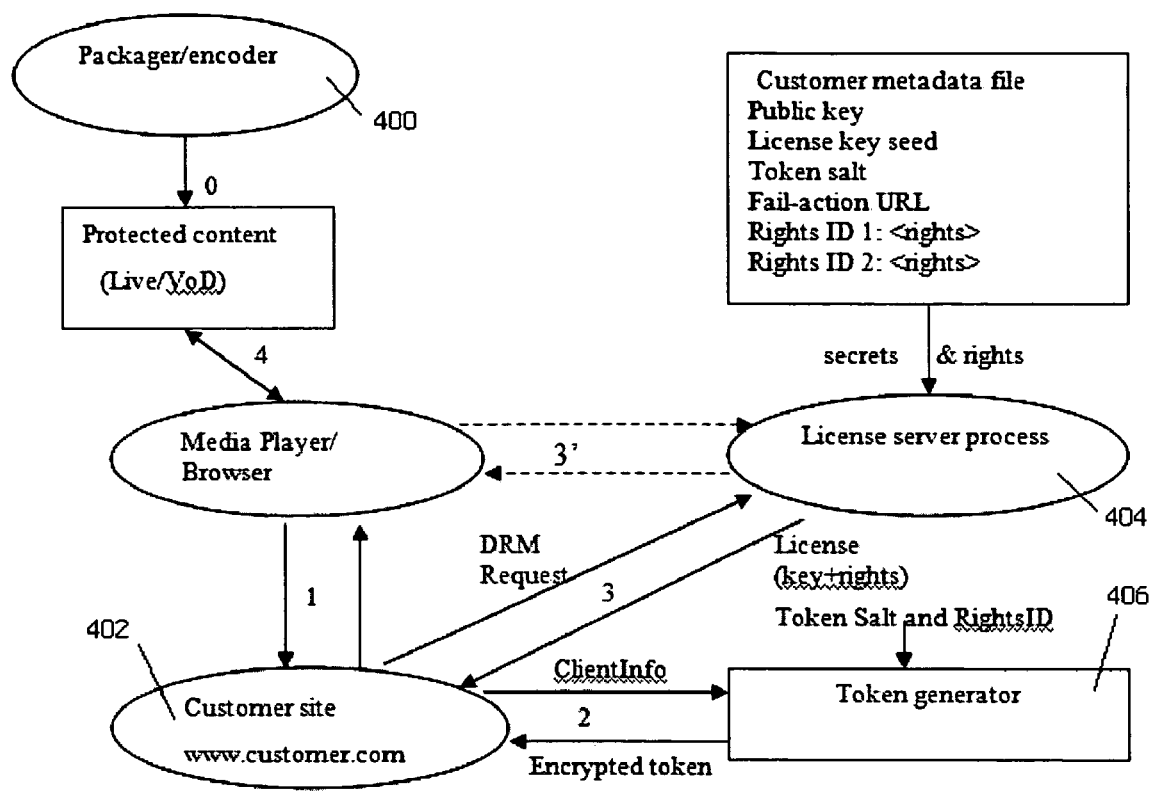
FIG. 4 is a more detailed description of how DRM-protected content is delivered by the CDN.

FIG. 4 illustrates this process in more detail for streaming or on-demand media content delivery. At step 0, the CDN supplied packaging program 400 generates a key, generates and signs the content header, and then encrypts the file (e.g., a Windows media file) with this information. The content header of a packaged media file contains the following information: KeyID and license acquisition URL. At step 1, an end-user visits the content provider's web site 402 and performs a business transaction. After registration/login and/or payment collection, once the content provider decides to make the content available to the end-user, the content provider's site 402 generates a token (using the shared-secret agreed between the CDN and the content provider) and does one of the following depending on a selected security model: (a) the customer site contacts a CDN license server 404 to get a license; this is shown as step 3 in FIG. 4, or (b) the customer site sends the end-user's browser to the CDN license server (usually this will be done in the background while the end-user stays on the content-provider's site); this is shown as step 3' in FIG. 4. As seen in the drawing, at step 2, the CDN-supplied tokenizer 406 (a software program, process, thread, or the like) generates a token, preferably using a shared-secret agreed between the CDN service provider and the content provider, and this token is used to contact a CDNSP DRM license server 404. This process is described in more detail below. At step 3, the CDN license server 404 validates the token presented by the customer site (or end-user's browser). The token usually has information to issue the license to "user U with rights R for content C." Preferably, the license server 404 first validates the token, preferably using a token salt, and ensures that the token has been issued by the content provider's site. Once the token is found to be valid, it generates and issues a DRM license that contains a key to decrypt the encrypted content at the player. This process is also described in detail. At step 4, the end user attempts to access the protected content and plays the content. If the end user does not have a valid license, the end user needs to get a license. The Content header of the encrypted file (or live stream) includes the license acquisition URL. When an end user tries to play a DRM protected media file that does not have a license, the player opens the license acquisition URL and attempts to get the license. Typically this will be a URL to the content provider's web site asking for a registration/subscription renewal or payment (i.e. step 1).

Before the CDN can begin issuing licenses for a customer's DRM protected content, several secrets must be provisioned and shared by the CDN and its customer. The following describes the process for two types of streaming media. The secrets are generally broken down into secrets required for packaging content (both for live and on-demand), and secrets required for token generation. In one embodiment, the CDN may provide the customer with an application, which will allow either the CDNSP or the customer to generate all required, shared secrets. These shared secrets must be kept secret and communicated to the other party over some secure channel. Provisioning for on-demand video typically will require generation of a DRM VOD XML file (sometimes referred to as a DRM VOD Specification) that the user loads into the CDN packager tool to package files using this set of shared secrets. Required tags would include Key_seed, an encryption seed, Header_private_key, a private key for signing a header, Header_public_key, a public key for signing a header, License_URL, a license acquisition URL, and Individualization, a required client individualization level. Additional tags (keys and certificates) may be implemented as well. The provisioning tool may rely on a DRM provider's SDK (e.g., Windows Media Format SDK) to generate seeds and keys. Provisioning for live video requires the generation of a DRM profile export file, which typically is a password-protected encrypted file that includes information necessary for an encoder to generate a DRM-protected live stream compatible with the CDNSP license server, together with an XML file (sometimes referred to as a DRM Live Specification) that includes a Key_seed tag and a Header_public_key tag and their associated values. The latter file may also include a Profile_import_password tag that defines a password for importing an associated DRM profile. Likewise, the provisioning tool may rely on the DRM provider's SDK to generate the DRM profile.

In a representative embodiment, there are two additional shared secrets needed for token generation and parsing. A token salt is required for MD5 digest calculation for the DRM token. A base64-encoded 128-bit Rijndael key may be used to encrypt an optionally included encryption Seed and public key. The customer and the CDN must share these values securely for successful secure license delivery. The Rijndael key is not necessary for all token generation scenarios.

Once the customer has decided to issue a license to an end-user, it must communicate the details of this desired license to the CDN license server. This information may be communicated in the URL used by the end-user client (e.g., an end user browser media player) to request a license, e.g., a token in the form of a query string. The following section will describe the format of the query string and the workflows that determine which optional components of the query string may be used. In a representative embodiment, there are two major provisioning/token generation workflows: shared secrets in metadata, and shared secrets in query string. In the first workflow, a customer uses a CDN DRM provisioning tool to generate a DRM VOD Specification (along with its associated DRM Profile) and/or an DRM Live Specification. The values in the generated specifications are securely communicated to the CDNSP are entered in the CDN's metadata transport system (reference number 116 in FIG. 1) under a specification identifier. In this case, when the customer generates a query string token for use in license delivery, it will specify this identifier in the query string. In the second workflow, it is assumed that the customer does not want to add their shared secrets (encryption seed and public key) to metadata (or perhaps because the CDN does not implement such a transport system). This may be due to security concerns on the part of the customer, or because the particular workflow of the customer requires frequent specification generation. In this case, the customer (or some third party on the customer's behalf) manages its own database of encryption seeds and public keys. They are communicated to the CDN license server in the query string during each license request. To maintain security for these two secrets, preferably they are encrypted using the Rijndael cipher before being placed in the query string. The Rijndael key used for this encryption may be provisioned per-customer and may be stored on the license server in metadata associated with that customer. A specification identifier is specified in this case as well, and this identifier may be used to determine the token salt and Rijndael key.

Preferably, the CDN license server (a program, process, execution thread, or the like) responds to license requests with a valid DRM license only if the request has a valid token associated with it. As noted above, preferably the token is generated at the customer's site using CDN-supplied tools. A representative URL for a DRM license request to a CDN license server may take the form:

http://abc.wm.edgedrm.net/getLicense?<query string>, where <query string> is a series of name-value pairs taking the form "name=value", with successive name-value pairs are separated by ampersands. The required names recognized by the license server are set forth below in Table 1:

TABLE 1

| Name | Description | Value Type |
|---|---|---|
| Drm | Token type and flags | A single digit followed by base64-encoded flag word |
| Digest | MD5 token digest | Base64-encoded 16-byte MD5 digest |
| Keyed | Key ID | Cleartext string |
| Ts | Token creation time, in GMT seconds-since-epoch | Cleartext 32-bit integer |
| specID | Spec ID | Cleartext 32-bit integer |
| rightsID | Rights ID | Cleartext 32-bit integer |

The Token type and flag indicates the token type, and a 16-bit bit field of flags indicates the required presence of any optional query string parameters. The defined bit values are listed in the following Table 2. A query string parser will ignore flag bits that are set but undefined.

TABLE 2

Query string flag bitmap definitions

| Required Query String Component | Flag Value |
|---|---|
| Time window | 0x0001 |
| Encryption seed | 0x0002 |
| Public key | 0x0004 |
| cInfo | 0x0008 |
| Chg | 0x0010 |

An MD5 digest is calculated at token generation time and included in the query string. The license server recalculates the digest upon reception of a license request and verifies that the digest is identical before processing the request. Preferably, the digest is calculated over the values of all recognized name-value pairs included in the query string, other information in the request URL, and a secret Token salt that is shared by the license server and the customer. The required timestamp is the token creation time. The optional time window parameter is used to prevent license re-acquisition for an expired license by simply resending the original license request. If the time window parameter is not found in the query string, the license server may use a value specified in metadata for the given customer. The query string must contain a specification identifier. An encryption seed/public key pair can appear in the query string. If encryption seed and public key are found in the query string, these values will be used during license generation. If encryption seed and public key are not in the query string, the encryption seed and public key associated with the specified (in query string) specification identifier are taken from the metadata. If the rights ID is not specified in the query string, the license server will use the default rights profile as specified in the metadata to generate the license. A license is bound to a particular client machine by the inclusion of a ClientInfo string generated on the requesting client machine. The string contains one or more pieces of data, such as an encrypted client ID, version information about given software on the end user's computer, other version information associated with the individual, or the like. The ClientInfo string is required to generate the license, and it ensures that the license is only good on the machine from which the end-user originally attempted to obtain the license. The particular manner by which the ClientInfo string is generated is DRM-implementation specific and outside the scope of the present invention.

In a representative embodiment, customer specific information is stored in per-customer metadata. A representative metadata file would include the following information: license key seed (the shared secret between the CDNSP and the customer for content encryption), the token salt (a value shared between the CDNSP and the customer to compute the token digest), a public key (used for signing the license), a customer code (used to identify the customer to the CDN), a fail action URL (the customer's Web site URL, as license requests with invalid tokens would be re-directed here), a Rijndael key (used to decrypt the license key seed if supplied as part of the token), a priority value (used if the customer has multiple licenses for a single content item), Rights ID, and Specification ID. The content provider can specify a list of rights-profiles. A rights-profile describes a specific set of rights to be issued with a license. A customer would typically set up one or more of such rights profiles in metadata and indicate the Rights ID to be used for a given license in the token sent with the license request. As noted above, users have an option to specify the encryption seed and public key through the query string or they can associate an encryption Seed and public key to the specification identifier passed as part of the query string. The CDN license server uses the specification identifier to choose the matching shared secrets from metadata and uses the secrets to generate the license. Although not required, by specifying a different Specification ID the shared secrets can be rotated. This is useful mainly for rotating the token generation related secrets. The CDN customer may require that the files be played only on an application that has been "individualized" by specifying a minimum individualization version number (this number may be included in the ClientInfo string). If a consumer tries to play a media file that requires individualization using a player that has not been individualized, a license is not issued and the player prompts the consumer to get a security upgrade.

The following provides details regarding the CDN license server. In an illustrative embodiment, the license server is a process running at an edge server acting as the license server. The process listens on a given port (e.g., port 8083) and accepts DRM requests from end user browser media players (or the like). If necessary, a customer site preferably contacts a license server process with the DRM request on port 80, and this request is then tunneled to the license server process on the given port. The edge server license process listens on the given port and accepts requests such as HTTP GET or POST requests. As has been described, the process takes input from a user supplied token and customer metadata parameters (e.g., encryption key seed, which is used to protect the content, and token salt, which is used to protect the token) to generate a license. In operation, there are two major steps performed during this process: validating the supplied token, and license generation and delivery. The token validation process is illustrated in the flowchart of FIG. 5, and the license generation and delivery process is illustrated in the flowchart of FIG. 6.

Figure 5:
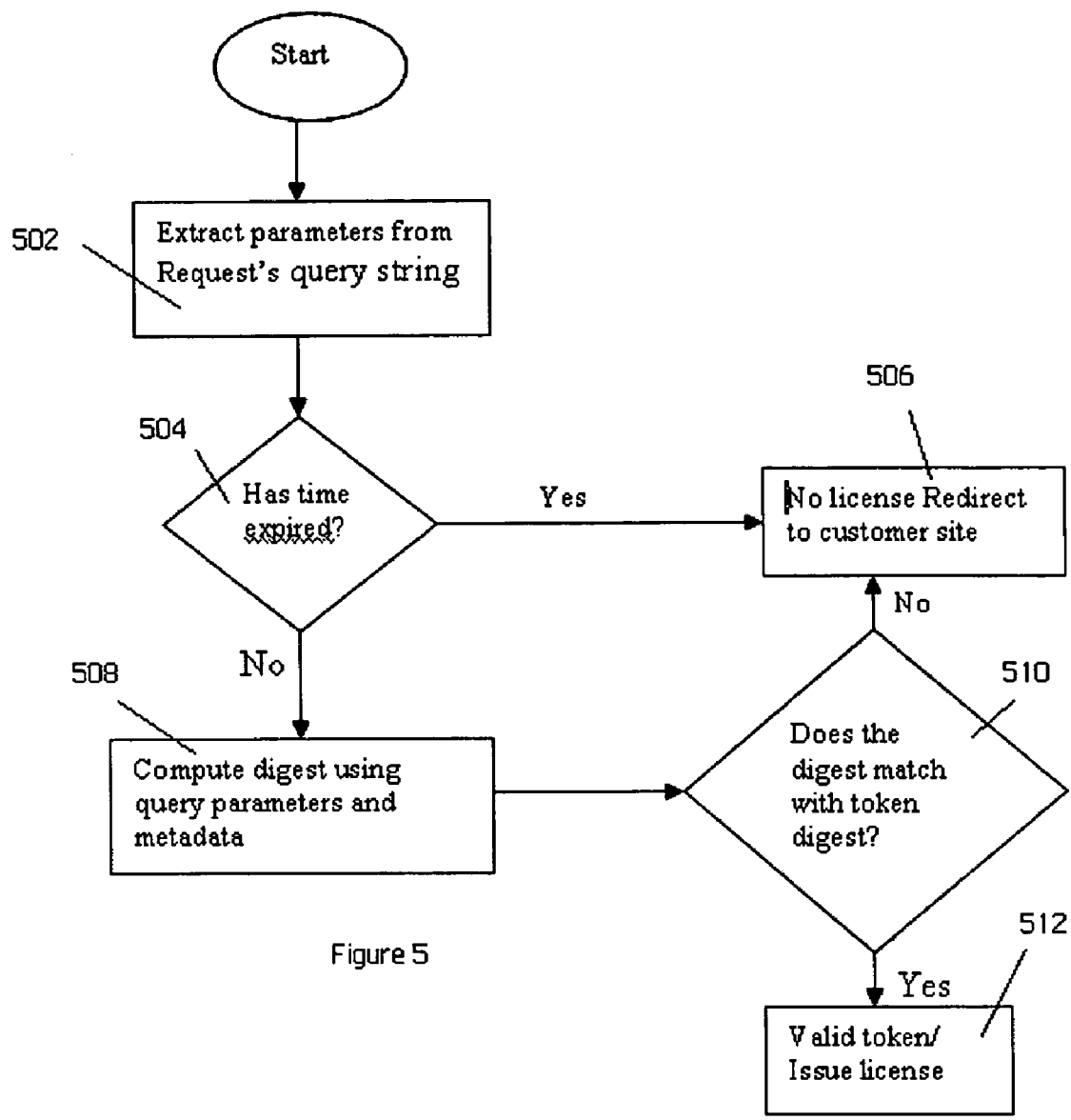
FIG. 5 illustrates a token validation process performed by a CDN license server process.

As illustrated in FIG. 5, a DRM request to the CDN license server process always contains a token in the form of query string. The request will not be processed if the token present is not valid. To check validity of the token, the edge server license process creates a dummy token digest using the same scheme mentioned in the token generation section above. It then compares the generated token digest with the supplied digest. If they match, the license server process assumes that the request is valid. Thus, with respect to FIG. 5, the routine starts at step 502 by extracting parameters from the request's query string. A test is then performed at step 504 to determine whether a given time associated with the token has expired. If so, the routine branches to step 506 and issues a "no license" redirect to the customer's site (and/or, in the alternative, logs an access denied error). If, however, the outcome of the test at step 504 is negative, the license server process computes the digest using the query parameter and the metadata information. This is step 508. A test is then performed at step 510 to determine if the digest matches that associated with the token. If the outcome of the test at step 508 is negative, the routine issues the "no license" redirect at step 506. If, however, the outcome of the test at step 510 is positive, the token is validated and the license is then generated at step 512.

Figure 6:
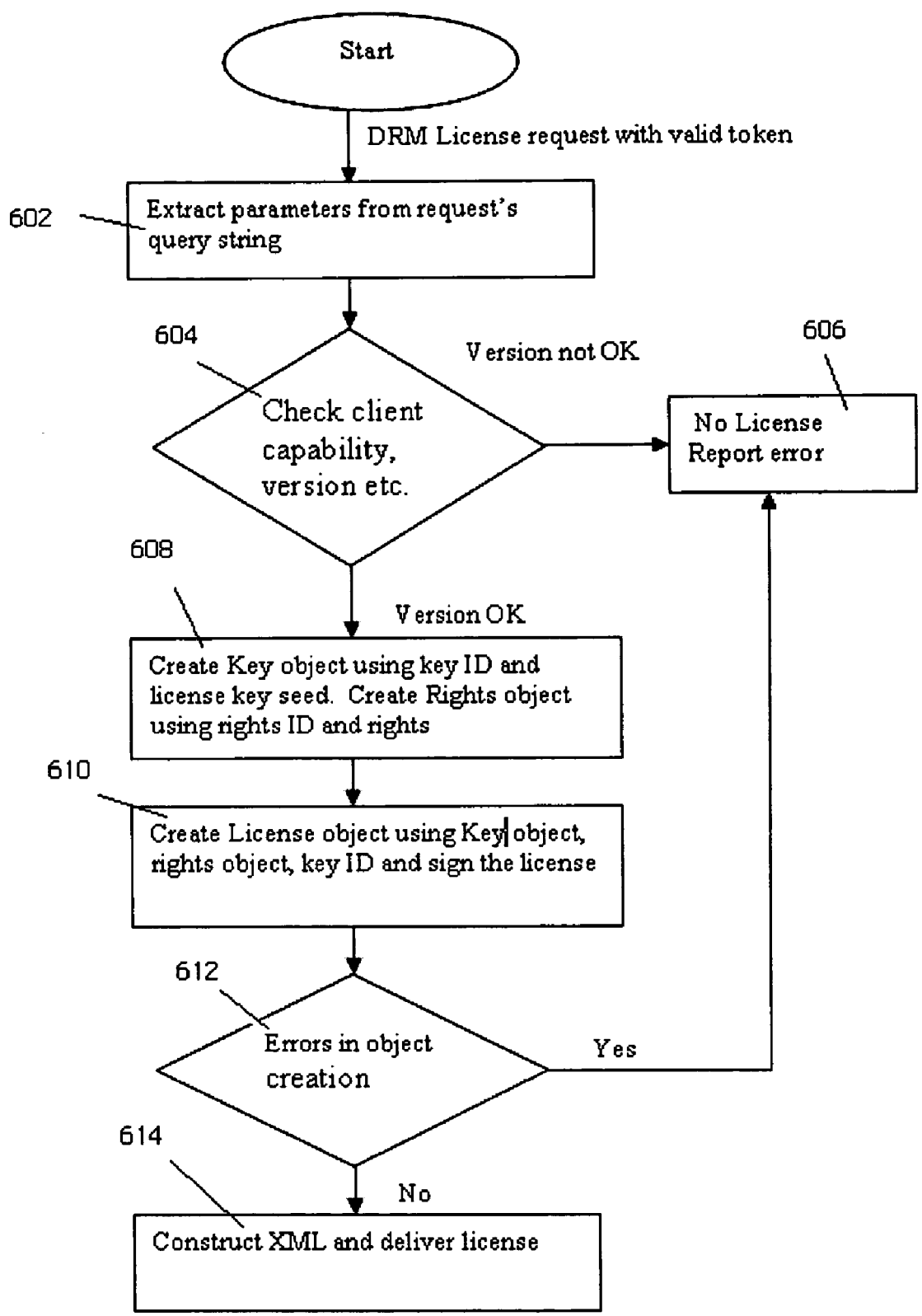
FIG. 6 illustrates how the CDN license server process generates and delivers the license.

FIG. 6 illustrates the license generation process. As noted above, the license includes at least the key to play the encrypted content, as well as the rights and conditions of the license, and it may also include other information (e.g., priority value, attributes identifying the CDN, or the like) as may be desired or required by the particular DRM solution. The routine begins after the server process has validated the token, as described in FIG. 5. At step 602, the routine extracts parameters from the request's query string. At step 604, a test is performed to check the ClientInfo string (e.g., client capability, version, etc.) or the like. If the outcome of the test at step 604 indicates an issue, the routine branches to step 606 and issues a "no license" redirect, logs an error, or the like. If, however, the outcome of the test at step 604 is positive, the routine continues at step 608 to create a key object using the Key_ID and license key seed. During this step the server process also creates a rights object using the Rights_ID and the defined license rights. At step 610, the server process then creates a license object using the key object, rights object and Key_ID, and signs the license. At step 612, a test is performed to determine if there were any errors in the creation of the various objects. If so, the routine branches back to step 606. If, however, the outcome of the test at step 612 is negative, the routine continues at step 614 to construct the license (preferably as an XML file) and to deliver that license to the requesting end user's browser media player (or other rendering engine, as the case may be).

Although the license server process has been described as a single entity, this is not a requirement. One or more of the functions may be implemented in one or more execution threads, or multiple threads or processes may be implemented. Generalizing, any set of one or more processes, programs, threads, or the like that provide the token validation and license generation functions may be implemented in a given edge server. The license server may also include ancillary functions such as data logging, load reporting, and the like, to store and export operational data to other CDN processes. Moreover, it is not required that the license server process be distinct from the other edge server processes (e.g., metadata handling, object caching, or the like). Further, it is not required that each edge server in the CDN (or even in a given region) support the server license process. There may be a dedicated subset of server license machines running in the CDN, albeit in a distributed manner. According to the invention, however, it is not anticipated that there will be any centralized place where license keys for the CDN-sourced content are generated. As used herein, a "license server process" should be broadly construed as given software instructions, program sequences, code portions, and the like, executable by one or more processors. According to the invention, a set of such processes provide distributed license serving and operate in a de-centralized manner, preferably without access to authentication information associated with end users requesting the given content.

According to another feature of the present invention, in addition to having license rights specified in the Rights_ID (which are available in metadata in the CDN license server), the system may be adapted to handle dynamic rights tokens. In this variant, the CDN license server process manages different rights dynamically, per request, which affords much greater flexibility in handling rights per license and avoids metadata rights provisioning. Preferably, dynamic rights are generated by the tokenizer tool, using advanced options and inputs. The token generator typically executes on the customer's Web site as illustrated in FIG. 4. When using dynamic rights, the Rights_ID is still needed in the license request. In this case, the license server process first applies the rights specified by the Rights_ID, and it then replaces or add rights as specified in the dynamic rights license request. Table 3 below lists representative dynamic rights and their semantics with given types of token generators (e.g., Perl, ASP and Java):

TABLE 3

Representative Dynamic Rights

| WM Series 9 Right | Description | Perl Input Options | ASP Properties to DynamicRights Object | Java Methods of DynamicRights Class |
|---|---|---|---|---|
| AllowBackupRestore | Boolean | allowbackuprestore | AllowBackupRestore | setAllowBackupRestore |
| AllowBurnToCD | Boolean | allowburn | AllowBurn | setAllowBurn |
| AllowPlayOnPC | Boolean | allowplay | AllowPlay | setAllowPlay |
| BurnToCDCount | Copy Count | copycount | CopyCount | setCopyCount |
| BeginDate | Calendar Date | begindate | BeginDate | setBeginDate |
| DeleteOnClockRollback | Boolean | deleteonclockrollback | DeleteOnClockRollback | setDeleteOnClockRollback |
| DisableOnClockRollback | Boolean | disableonclockrollback | DisableOnClockRollback | setDisableOnClockRollback |
| ExpirationAfterFirstUse | Calendar Date | expirationafterfirstuse | ExpirationAfterFirstUse | setExpirationAfterFirstUse |
| ExpirationDate | Calendar Date | expirationdate | ExpirationDate | setExpirationDate |
| ExpirationOnStore | Calendar Date | expirationonstore | ExpirationOnStore | setExpirationOnStore |
| MinimumAppSecurity | Security Level | minimumsecurity | MinimumSecurity | setMinimumSecurity |
| MinimumClientSDKSecurity | Client Version | minimumclientsecurity | MinimumClientSDKSecurity | setMinimumClientSDKSecurity |
| Playcount | Play count | playcount | PlayCount | setPlayCount |
| ExcludeApplication | Exclude app IDs | excludeapplication | ExcludeApplication | excludeApplication |

A representative example of how dynamic rights are established is illustrated by the dynamic rights object shown in FIG. 7. In this example, the content provider has created the object using an ASP token generator. The content provider then sets the desired properties with this object, and these properties may then be applied on a per license request basis.

The present invention has numerous advantages. As noted above, the invention provides for a highly scalable, highly-available, distributed license server infrastructure, together with the customary advantages of a CDN, which is used for the delivery of the protected content. As noted above, in the preferred embodiment, the invention provides that business logic (payment processing, and the like) are separate from content protection. This separation is enforced by having business logic handled by the content provider (or some entity on its behalf) while having the security (license serving) handed by the CDN, which is also responsible for serving the protected content. This enables CDN customers to implement flexible business rules that are appropriate for their business model. Preferably, the CDN is not involved in keeping track of its customer's end user's identity in a database.

The present invention is not limited for use with any particular type of content, such as streaming media, but is useful for delivery of any protected content, including Web content, software downloads, and the like. Also, as used herein, "protected" content should be broadly construed to cover known or later developed methods for securing content against unauthorized activities at a given end user machine.

In addition, if desired, the CDN may implement a key management infrastructure to manage the license keys generated by the CDN license server processes.

Having described our in invention, what we claimed is as follows.

The invention claimed is:

1. Apparatus operative in a distributed network in which content providers offload given content for delivery from servers managed by a content delivery network service provider, wherein the given content is secured by a digital rights management scheme comprising:
   a set of processors located across the distributed network; and
   computer memory associated with each processor and holding computer program instructions that when executed by the processor comprise a license server processor that is operative to receive and verify a token generated according to a secret shared only by a given content provider and the content delivery network service provider to thereby generate a license by which an end user client obtains rights for given content of the given content provider, the license including a decryption key;
   wherein the license server processors executed on the set of processors located across the distributed network comprise a distributed set of license server processors that operate autonomously from one another to enable decryption keys to be generated and managed from individual license server processors in a de-centralized manner and without access to authentication information associated with end users requesting the given content.

2. The apparatus as described in claim 1 further including computer program instructions that when executed by a processor comprise a media server processor, and wherein the given content is a media stream served by the media server processor.

3. The apparatus as described in claim 2 wherein the media stream is a live stream or a stream that is stored in the distributed network and available on-demand.

4. The apparatus as described in claim 1 wherein the rights in the license are established by a given license server processor based on data in a metadata file associated with the given license server processor.

5. The apparatus as described in claim 1 wherein the rights in the license are established by a given license server processor dynamically on a per request basis based on data in the token.

6. The apparatus as described in claim 1 wherein, following verification of the token, the license server processor generates the license by extracting one or more parameters from a request query, creating a key object, and creating a rights object.

7. The apparatus as described in claim 6 wherein the license server processor generates the license by creating a license object from the key object and the rights object.

8. Apparatus operative in a distributed network in which content providers offload given content for delivery from servers managed by a content delivery network service provider, wherein authorization to access the given content is obtained through business logic and the given content is secured by a rights management (DRM) scheme, comprising:
   a set of processors located across the distributed network; and
   computer memory associated with each processor and holding computer program instructions that when executed by the processor comprise a license server processor that is operative to receive and verify a token generated according to a secret shared only by a given content provider and the content delivers network service provider to thereby generate a DRM license by which an end user client obtains rights for given content of the given content provider;
   wherein the license server processors executed on the set of processors located across the distributed network comprise a distributed set of license sever processors that operate autonomously from one another to enable DRM licenses to be generated and managed from individual license server processors in a de-centralized manner and without access to the business logic or any authentication information associated with end users requesting the given content.

9. The apparatus as described in claim 8 further including computer program instructions that when executed by a processor comprise a media server processor, and wherein the given content is a media stream served by the media server processor.

10. The apparatus as described in claim 9 wherein the media stream is a live stream, or a stream that is stored in the distributed network and available on-demand.

11. The apparatus as described in claim 8 wherein the rights in the license are established by a given license server processor based on data in a metadata file associated with the given license server processor.

12. The apparatus as described in claim 8 wherein the rights in the license are established by a given license server processor dynamically on a per request basis based on data in the token.

13. The apparatus as described in claim 8 wherein following verification of the token, the license server processor generates the license by extracting one or more parameters from a request query, creating a key object, and creating a rights object.

14. The apparatus as described in claim 13 wherein the license server processor generates the license by creating a license object from the key object and the rights object.

* * * * *